United States Patent
McQueen

(10) Patent No.: US 9,671,265 B2
(45) Date of Patent: Jun. 6, 2017

(54) THERMAL DISPERSION MASS FLOW RATE, MATERIAL INTERFACE, AND LIQUID LEVEL SENSING TRANSDUCER

(71) Applicant: FLUID COMPONENTS INTERNATIONAL, LLC, San Marcos, CA (US)

(72) Inventor: Malcolm M. McQueen, Encinitas, CA (US)

(73) Assignee: FLUID COMPONENTS INTERNATIONAL LLC, San Marcos, CA (US)

(*) Notice: Subject to any disclaimer, the term of this patent is extended or adjusted under 35 U.S.C. 154(b) by 0 days.

(21) Appl. No.: 15/256,533

(22) Filed: Sep. 3, 2016

(65) Prior Publication Data

US 2017/0003155 A1    Jan. 5, 2017

Related U.S. Application Data

(63) Continuation-in-part of application No. 13/843,251, filed on Mar. 15, 2013, now abandoned.

(51) Int. Cl.
  *G01F 1/69*    (2006.01)
  *G01F 23/22*   (2006.01)

(52) U.S. Cl.
  CPC ............. *G01F 1/69* (2013.01); *G01F 23/22* (2013.01)

(58) Field of Classification Search
  CPC ........................................................ G01F 1/69
  See application file for complete search history.

(56) References Cited

U.S. PATENT DOCUMENTS

| | | | |
|---|---|---|---|
| 2,550,418 A | 10/1945 | MacDonald | |
| 3,898,638 A | 8/1975 | Deane et al. | |
| 5,999,081 A * | 12/1999 | Hannigan | G01K 1/10 338/229 |
| 6,130,598 A | 10/2000 | Katsuki et al. | |
| 6,485,175 B1 * | 11/2002 | Nimberger | G01F 1/36 374/142 |
| 7,642,096 B2 | 1/2010 | Hunter et al. | |
| 7,855,632 B1 * | 12/2010 | Schuh | G01K 1/08 338/28 |
| 2003/0115950 A1 | 6/2003 | Ambrosina et al. | |

(Continued)

OTHER PUBLICATIONS

Norfolk, Mark. "Cool Tech: Flux Free Soldering." Edison Welding Institute. Edison Welding Institute, Jun. 24, 2010. Accessed on Oct. 21, 2016. <http://ewi.org/cool-tech-flux-free-soldering/>.*

*Primary Examiner* — Robert Huber
*Assistant Examiner* — Herbert K Roberts
(74) *Attorney, Agent, or Firm* — The Maxham Firm

(57) ABSTRACT

A thermal mass dispersion flow rate sensing transducer and transducer assembly or instrument for improved functional life of the transducer without degradation in sensing accuracy. Several aspects of the transducer components and structure reduce thermal leakage within the transducer so the sensor (RTD) output signal is accurately transmitted to the signal processor, resulting in precise ΔT determinations and consequent precise determinations of mass flow rate of the fluid flowing in the conduit. Additionally, the same components and structure also have long life without appreciable degradation, thereby delaying any basis for the need for recalibration of the instrument.

13 Claims, 8 Drawing Sheets

(56) References Cited

U.S. PATENT DOCUMENTS

| | | | |
|---|---|---|---|
| 2007/0171959 A1* | 7/2007 | Irrgang | G01K 1/10 374/185 |
| 2009/0260431 A1* | 10/2009 | Olin | G01F 1/684 73/204.22 |
| 2009/0323765 A1* | 12/2009 | Yokoi | G01K 1/08 374/185 |
| 2011/0026562 A1 | 2/2011 | Bernier et al. | |
| 2011/0308317 A1* | 12/2011 | Mueller | G01F 1/662 73/632 |
| 2012/0020385 A1* | 1/2012 | Matsuo | G01K 1/08 374/158 |

\* cited by examiner

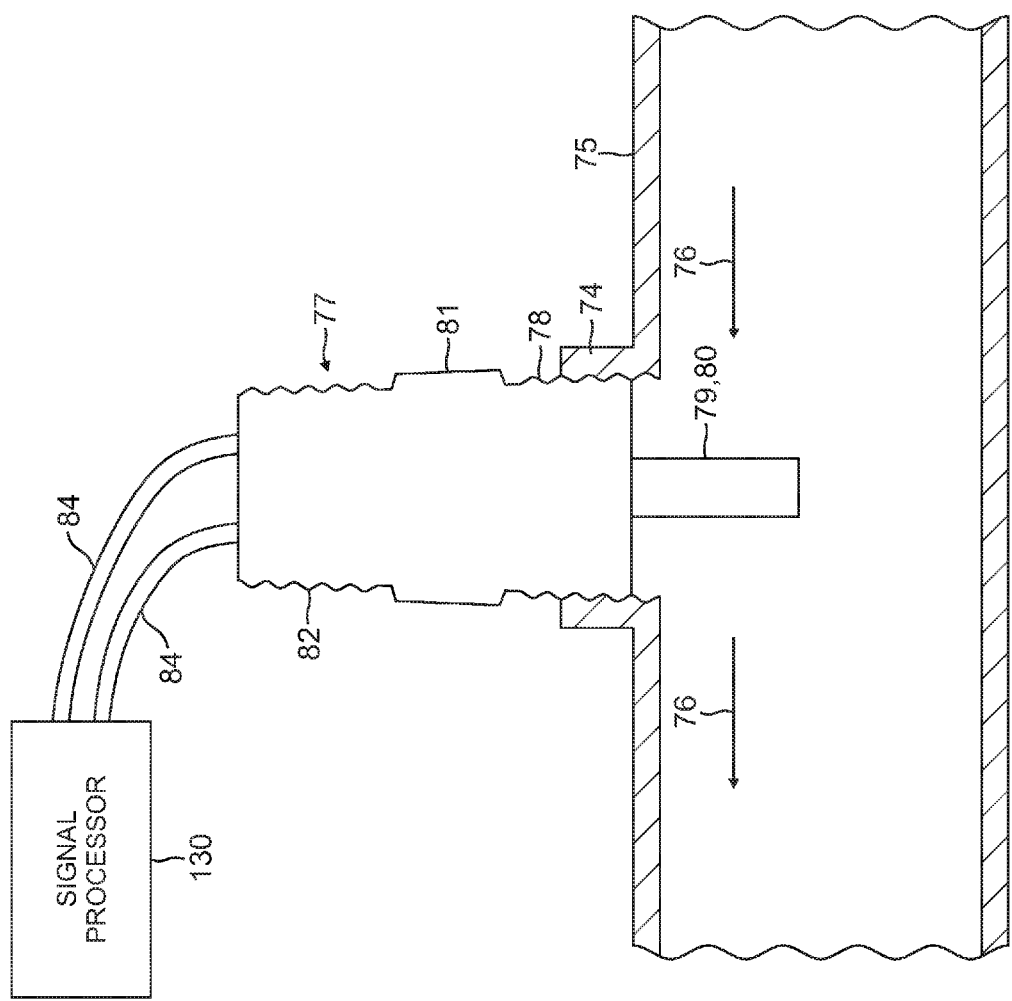

THERMAL DISPERSION MASS FLOW RATE, MATERIAL INTERFACE, AND LIQUID LEVEL SENSING TRANSDUCER

FIELD OF THE INVENTION

This concept relates generally to thermal dispersion, highly precise sensing transducers and, more particularly, to innovations relating, in part, to reducing thermal leakage from or to the sensor, and providing higher signal to noise ratio, which improve the performance of the transducer in terms of accuracy, response time, cost, power consumed, durability, repeatability from instrument to instrument, which is accurate reproduction or fidelity, and repeatability of the same instrument over time, correcting what is generally referred to as "sensor drift."

DISCUSSION OF THE PRIOR ART

Thermally-based fluid flow, liquid level, and fluid interface transducers or sensors employ the well-known and long established principle that is heated sensor will have different characteristics with temperature changes. A resistance temperature detector (RTD) will have a temperature change as the process temperature of the fluid in which the sensor is immersed or the velocity of fluid past the sensor draws heat away from the sensor. Thus, a heated sensor in gas or liquid or in a flowing media will give up some of its heat to the media/process. That creates measurable changes in the resistance of an RTD as a function of the fluid and the flow-rate or interface from fluid to fluid or to gas. Early such transducers are shown in U.S. Pat. Nos. 3,366,942 and 3,898,638. For reference purposes, there are two variations in the structure and manner of operation of such sensors. As shown in the '638 patent, one thermal well functions as a beater to beat the nearby active sensor. A third thermal well is a reference or inactive sensor and is far enough from the heater to not be affected by the added heat and measures the media temperature. The other, and now more common type, is the self-heated RTD in lieu of a separate heater, as above. This device may function on a time-shared basis or it may simply be a self-heated sensor combined with a second, unheated, reference sensor. The amount of heat dissipated by the fluid is measured by appropriate precise means. A time-shared RTD heats itself when extra current is applied and then is cooled by the contacting fluid when the heat current is removed, thereby eliminating the need for a second, unheated RTD or so called reference sensor.

Such RTD sensors are normally quite small and generally rectangular, in the order of 0.062 inch long and 0.047 inch wide. Their attendant thermal wells may be as small as 0.030 inch inside diameter, up to about 0.250 inch in outside diameter, and generally a fraction of an inch to about one inch long. Those are only exemplary dimensions of such a transducer. Inside the thermal well is the actual sensing element, typically a solid state RTD, generally near the distal end of the device. The RTD element and its attendant communication wires lead out the proximal end from the RTD and the rest of the inside of the thermal well may be filled with potting material. However, in general and industry-wide, the potting material in the transducer has been a source of problems owing to changes in the heat transfer paths in the potting material, be it polymer, thermal grease, ceramic, or other material of means of mounting and, in particular, the mounting/heat transfer path to the process at other thermal sources to or from the temperature sensors.

Variations in potting material and its consistency are a handicap for repeatability from unit to unit. Degradation or other changes in the potting compound results in unpredictable changes in heat transfer characteristics of the sensor over time and temperature. FIG. 1 shows two exemplary thermal wells with large variations in the amount of potting material that may be used. The size has been exaggerated to make the point and it is also illustrative of the variations in the amount of potting material from unit to unit and is typical of current transducers of this type.

Consistency is, in fact, a bigger problem in that air bubbles are often entrained in the assembly process when potting material is added in the thermal well, and the RTD and its assembly of ceramic, tubing, and stranded copper leads are immersed in the semi-liquid potting material.

Also "pot life" of the potting material is a factor in that it changes with age and if the functional life of the potting material is at or near an end, the amount of entrained air increases, as does the thermal resistance of the cured potting material. Again, air entrainment varies and a small bubble of air can cause much higher temperatures in the RTD, thereby introducing significant variations in the accuracy and calibration fidelity to follow.

The same problem exists when a separate heater is used instead of self-heated RTDs. Coaxial heaters, as now used in some later model instruments, are superior to earlier models wherein a separate heater was placed in an adjacent and thermally bonded thermal well where such wells are fused together to promote heat transfer. This has been a significant problem because there were frequently multiple heat transfer paths as well as thermal variations in the fused joint affecting the unit-to-unit repeatability and the long term stability of the heat transfer paths.

Curing the potting material provides another instantaneous problem in that thorough curing of the polymer or ceramic potting is necessary. Partially cured units will change their calibration in a few days or even in several months after it is manufactured and calibration tests have been completed. This will also negatively affect the accuracy in service as compared to the calibration curves established for and sent by the manufacturer to the user with the sensor units.

As for particular types of potting material, which have been employed in such thermal transducers, thermal grease tends to dry out and turn to powder after several years of service, thereby causing a higher temperature to occur in the heated sensor. This change has serious consequences for in-service accuracy, response time, and range, among other drawbacks.

Finally, to try to prevent the above problems, a method has evolved for pressurizing the thin wall thermal well onto the within elongated cylindrical wire-wound RTD (FIG. 3A). The problem with this method is that when the hydro forming pressure is removed, the metal bounces back and thereby loosens the RTD which could subsequently move under service conditions. Low electrical resistance is still another handicap to this scheme, among others.

Ceramic can shrink or expand over time and abraid or crack with repeated temperature cycling. These conditions can lead to it gaps and, again, accuracy and response time deviations.

Polymers such as epoxy and silicone-based plastics degrade and age with temperature and time. Changes occur in the heat transfer coefficients causing like changes in accuracy, among other effects.

In addition, to thermal transducer inaccuracies resulting from potting problems as set out above, there are other sources of sensor output inaccuracies. Variations in the ambient (external) temperature and heat transfer conditions have been a source of error. When required to function in extreme weather conditions, where temperatures may range from as low as −65° F. to as high as +150° F., a conventional thermal sensor will be subject to erroneous output directly related to such conditions. Severe wind also affects the ambient extremes.

Apart from the ambient thermal conditions above, errors in sensor output may not be permanent and some of them may be ameliorated by recalibration. However, if recalibration is frequently required, the trust in the output of the sensor, and its operational value, are severely diminished. Depending upon the equipment and circumstances recalibration may entail a significant disruption of an important process. This is owing, in part, to the fact that heat and its effects on temperature at the sensor can transfer by conduction, radiation, and convection, as well as mass transfer from the media or process.

Since the subject matter here is thermal sensors it is generally conceded that accurate temperature measurement is one of the most difficult physical measurements to make. Volts, amps, weight, length, area, volume, density, and time are all comparatively easy dimensions to measure. The problem is compounded in flow switches and transmitters, and liquid-to-liquid interface sensors, because what is being measured are heat transfer rates, which is a much more difficult measurement than temperature alone. Accurate temperature representation is difficult but is a necessary component of heat transfer measurement. However, in this subject area of technology, precise temperature measurements, per se, are not required and temperature sensing devices are generally not relevant to the concept which is the subject of this disclosure. The apparatus only needs a temperature difference, a ΔT so consistency between two transducers is what is required to produce accurate flow rate and fluid level indications. A second major part is the accurate and unchanging properties of the possibly multiple heat transfer paths.

Relatively thick walls of the metal thermal wells and conductivity (thermal) from the RTDs to the variations in temperature of surfaces tend to produce errors in the accurate temperature sensing of the RTDs or other suitable temperature sensors such as thermocouples, among others.

Thermal conductivity along, and axial moist air and its corrosive effects by leakage between, stranded copper lead wires connected to the short and fine RTD lead wires is another source of error. This is particularly the case with short platinum leads from the RTDs as they are connected to highly thermally and electrically insulated stranded copper leads.

At least one supplier of these devices measures the effect of the above conductive effects along the walls of the thermal wells and electronically compensates for the error otherwise caused by ambient thermal conditions. That is an active compensation method. A different, passive method is herein taught in that the conductive heat transfer to or from any source other than the process is eliminated or suppressed to all but an infinitesimal value.

SUMMARY OF EMBODIMENTS OF THE INVENTION

A purpose of the disclosed embodiments is to control the heat transfer paths in thermal wells. Such control includes eliminating the need for potting of the RTD element or pressure forming the containing thermal wells. Additionally, the present concept substitutes a precision unchanging reproducibility thermal path between the RTD and the mounting surface of the thermal well in which the RTD is mounted. The precision, reproducible, and unchanging heat transfer path of the structure disclosed provides for high fidelity and consistent performance under all likely hostile service conditions so far as accurate, durable, and reproducible gas or fluid mass flow rate output, liquid level sensing, and interface sensing to and between non-miscible liquids and on non-liquids and slurries is concerned. For convenience, the concept of flowing fluid will be used herein, with the understanding that the structure applies equally to liquid level, non-miscible liquid interface sensing, and non-liquids and slurries.

A solid state RTD sensor is secured in the sensing or distal end of an elongated thermal well to provide efficient and comparatively very high thermal conductivity and high BIOT modulus from the end of the thermal well exposed to the media of interest to the RTD. The BIOT modulus is:

$$\frac{\text{SPECIFIC HEAT}}{\text{CONDUCTIVITY}}, \frac{\text{LOW HEAT STORAGE}}{\text{HIGH CONDUCTIVITY}}$$

and provides for fast response and high fidelity.

The structure for the RTD wires to be connected externally to the usual flow rate indicators is also configured to minimize heat conduction which could affect the accuracy of the RTD signals. Thus, ambient influences are effectively eliminated.

Further, the thermal well proximal end and connection to typical mounting means is also configured to minimize unwanted heat transference otherwise related to the RTD signal and the fluid flow being sensed by employing long thin axially poorly thermally conductive and radially highly thermally conductive metal thermal wells. A highly thermally conductive ceramic cement to assure media temperature and thereby prevent any other temperature source from affecting the sensing RTDs is also used.

A focus of the disclosed embodiments is to conduct electrical signals from the RTD sensor to an external location where the signals may be processed to indicate flow rate of a flowing media, for example, without uncontrolled significant heat transfer from the area of the sensing end of the thermal well. Any appreciable such thermal leak or transfer can affect the accuracy of the sensor. One such source of inaccuracy that the current structure effectively negates is thermal contamination from ambient, and other, usually external, sources.

Another focus of the present concept is to provide a time consistent structure, that is, one which does not deteriorate or change its output over an appreciably long period of time. Further, by employing two identical thermal wells for the active and reference sensors, any change with time will likely track with both transducers so there would be no variation in output with time.

BRIEF DESCRIPTION OF THE DRAWING

The objects, features, and advantages of the concept disclosed herein will be more readily perceived from the following detailed description, when read in conjunction with the accompanying drawing, in which:

FIG. 4A shows a sensor unit in accordance with an embodiment of the invention as it might be mounted through the wall of a conduit;

DETAILED DESCRIPTION OF EMBODIMENTS OF THE INVENTION

Figure 1A:
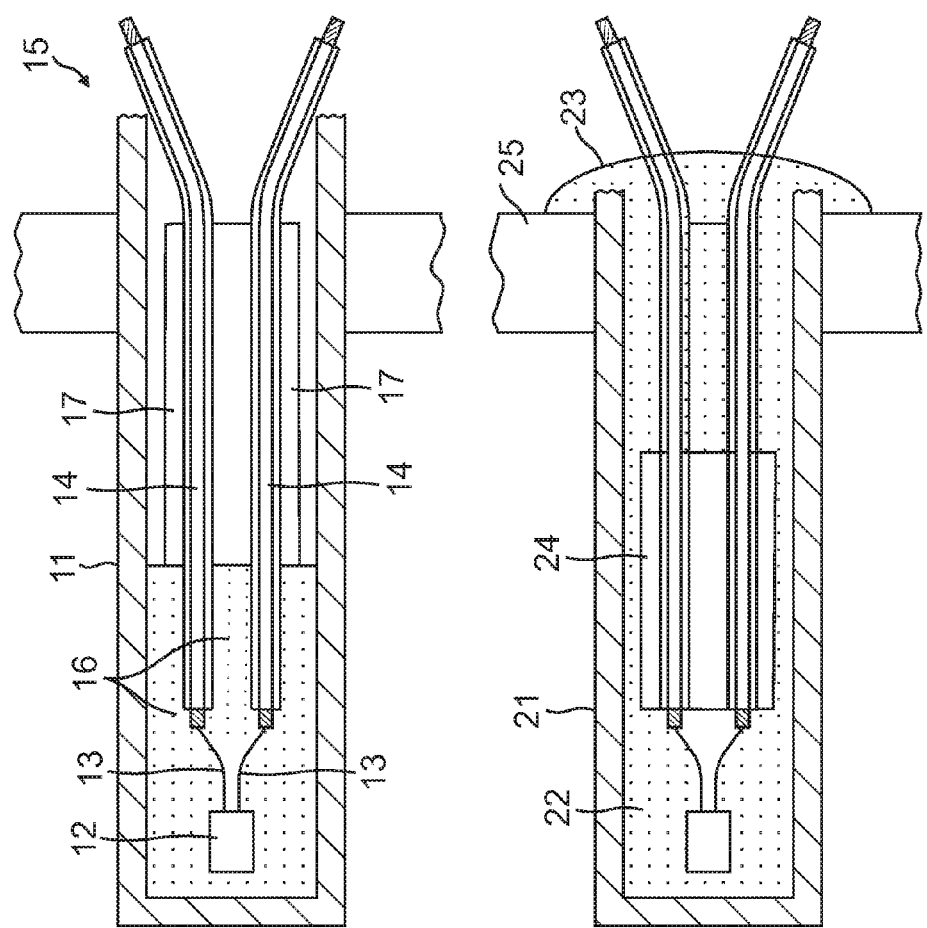
FIG. 1A is an enlarged sectional side view of a prior art thermal sensing transducer set of an instrument.
Figure 1B:
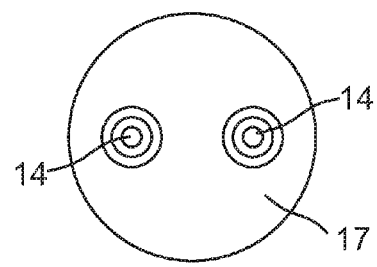
FIG. 1B is a sectional view of the ceramic insulator of FIG. 1A.

In the prior art of FIG. 1, thermal well 11 has RTD sensor element 12 therein. The RTD wires 13 are connected to stranded copper wires 14 and fed out proximal end 15 of the thermal well to appropriate connectors and signal receivers. The thermal well is partially filled with potting material 16 and a ceramic positioner/conduit 17 may be used.

Adjacent thermal well 21 of the same sensor installation is similarly constructed. It is fully filled with potting material 22, out to proximal end 23. A ceramic positioner 24 is shown in this example.

It should be noted that the external ends of two highly thermally radially insulated copper wires 14 are exposed to ambient conditions. Since copper is highly thermally conductive, the interior ends of those wires, in the vicinity of RTD 12, are also at ambient temperature. By having uncontrolled ambient thermal inputs in the area of RTD, a major source of error is involved, which is very difficult to compensate for because it is variable and unpredictable.

The two thermal wells are mounted in wall 25, which may be a bracket or the wall of a conduit or container. The thermal wells may also be mounted to a unit which is mounted in the wall. The two such thermal wells may be used to provide the active and the reference signals d of a conventional sensor installation, of the general type shown in U.S. Pat. Nos. 7,191,645, 5,913,250, 5,600,528, and 3,366,942.

Figure 2:
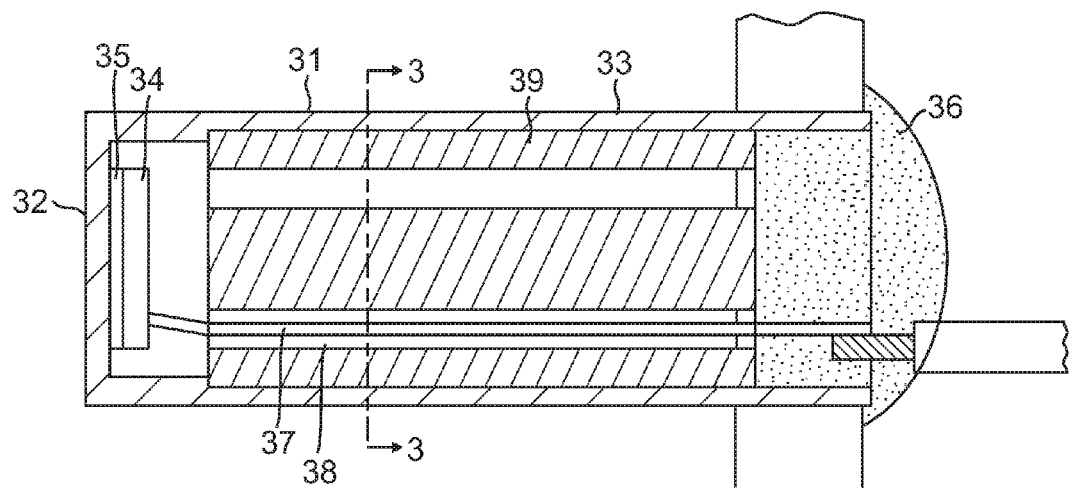
FIG. 2 is an enlarged sectional side view of a transducer in accordance with an embodiment of the present invention.
Figure 3:
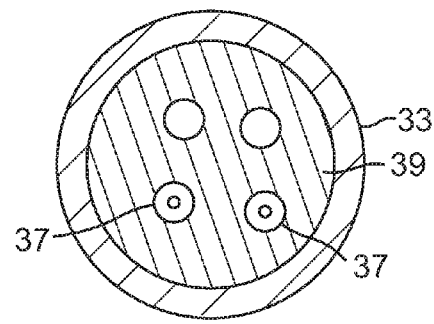
FIG. 3 is a sectional end view taken along cutting plane 3-3 of FIG. 2.
Figure 3A:
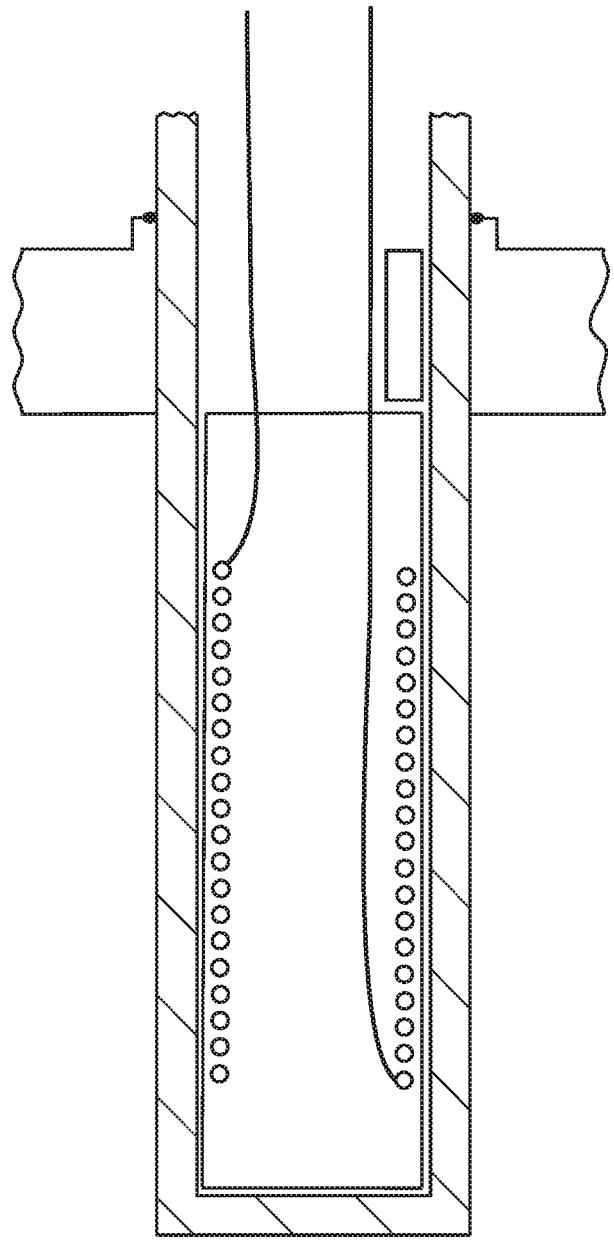
FIG. 3A is a sectional view of hydro formed RTD/thermal well (prior art)

According to an embodiment of the invention, FIG. 2 shows thermal well 31 having sensing end 32. Most of the length 33 of the thermal well is of reduced wall thickness. RTD 34 is secured to the inside surface of end 32.

The RTD is precision pre-tinned with high temperature solder 35 (585±5° F. fusion temperature) and is soldered down in a 600° F. salt bath, for example. This soldering process is accomplished without the use of a flux. The precision pre-tinning RTD produces relatively equal heat transfer paths from unit to unit and possibly eliminates the need for individual calibration of each switch and possibly the transmitter at ±3 accuracy. RTD wires 37 pass through bore 38.

Four-bore thermal insulator 39 occupies a significant portion of the inside of thermal well 31. The thin wall long thermal well is physically supported by the four-bore insulator 39 and isolates the RTD at its distal end from the environmental effects at the base or proximal end 36. The thermal well, normally made from stainless steel is a poor conductor of heat as far as metals are concerned. By making wall 33 of thermal well 31 extra thin, even less heat is conducted from one end to the other.

Figure 4B:
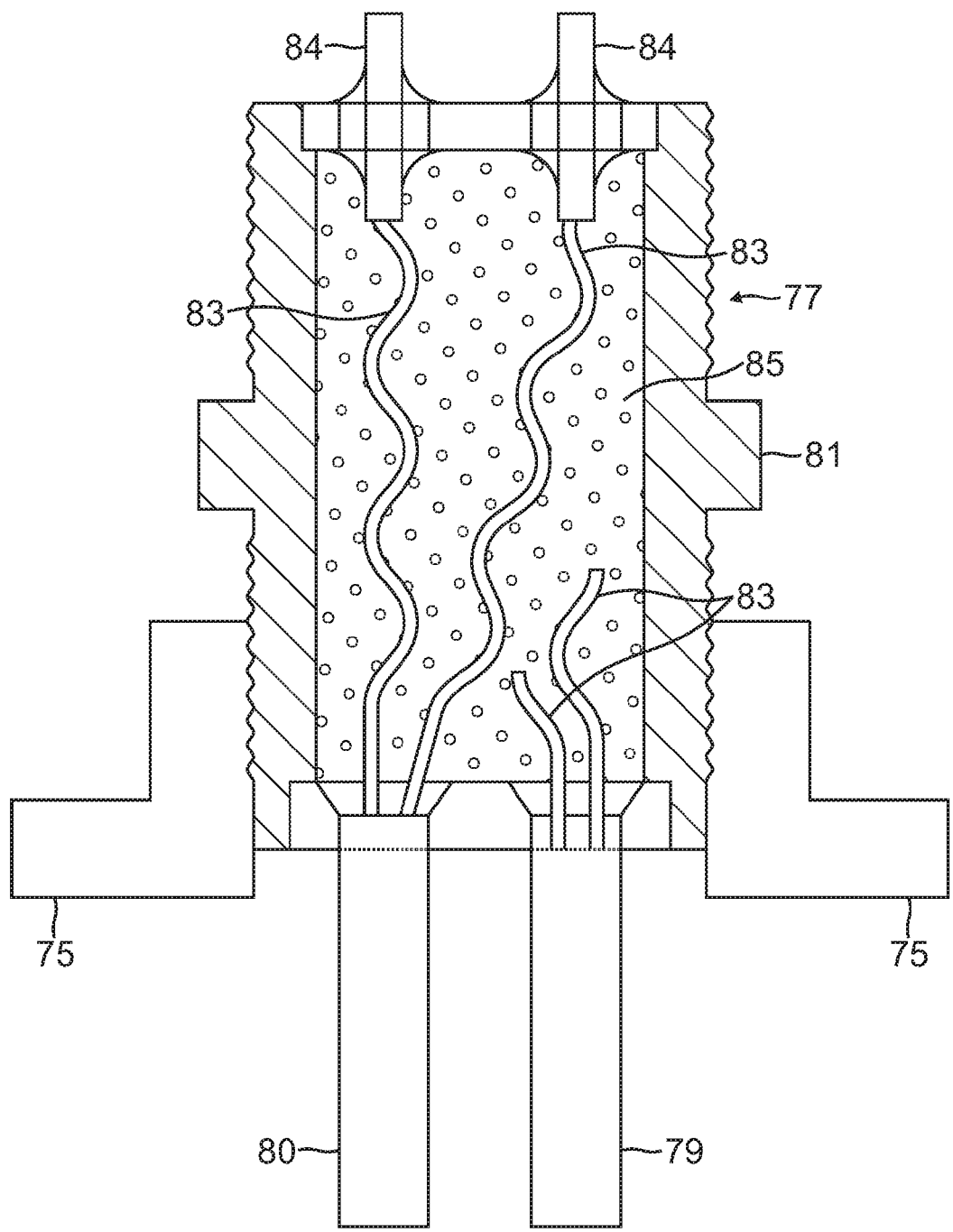
FIG. 4B is an elongated sectional view of the sensor unit of FIG. 4A, rotated by 90°.
Figure 4C:
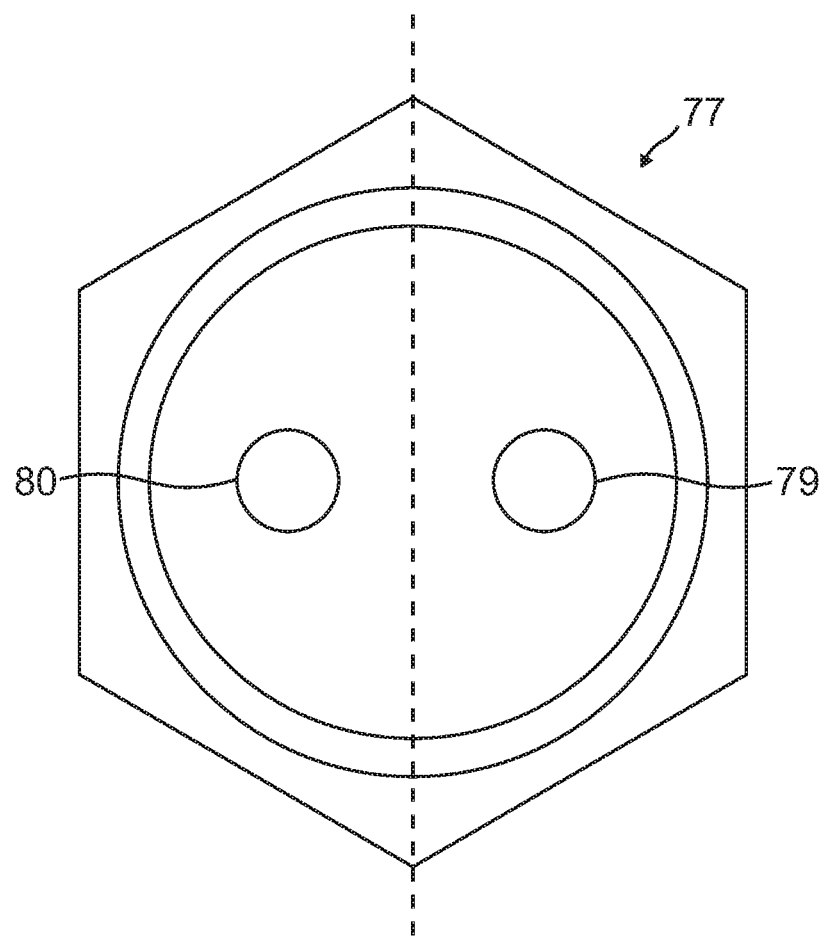
FIG. 4C is an end view of the sensor unit of FIG. 4B.

A preferred embodiment of a flow rate sensing transducer and installation according to the present concept is shown in FIGS. 4 and 5. In FIG. 4A nipple 77 is shown mounted in a wall of a conduit 75. Fluid flow is indicated by arrows 76 and flow could be in the opposite direction. Extending into the flowing media from nipple 77 is thermal well 79. There are two such thermal wells 79 and 80, as shown in FIGS. 4B and 4C. The direction of flow of the media would be into or out of the paper in the FIG. 4B view.

The inside surface of conduit 75 and fluid 76 are at the process or flowing media temperature. The outside surface of conduit 75, and everything outside of the conduit, including nipple 77, are externally at ambient temperature. Since ambient is external to the inside of conduit 75, the present structure is configured to prevent any ambient thermal effects from affecting the precise functioning of thermal wells 79, 80 and the sensing RTDs therein.

Threads 78 engage mating threads in collar 74 in the conduit wall, and central portion 81 of the sensor unit may be hexagonal in shape to accommodate a suitable tool for installing the unit to the conduit. Upper threads 82 are provided for connecting the unit to a housing which can include signal processing and flow rate indication apparatus, among other functions. In this case wires 84 are shown in electrical contact with signal processor 130.

The sensor unit is shown in enlarged sectional detail in FIG. 4B. Within nipple 77 are signal wires 83 from thermal wells 79, 80 to wires 84 which provide external access to the sensor signals. Each thermal well would normally have two signal wires 83. One such pair is shown truncated in FIG. 4B for simplicity. Signal wires 83 are preferably made of stainless steel and can be connected to posts or external wires 84 by welding, or other appropriate means.

The interior of nipple 77 is preferably filled with powdered insulation 85 which could be magnesium oxide (MgO) powder or other appropriate material. The use of MgO and stainless steel wires results in an ambient insulated thermal path to thermal wells 79, 80.

FIG. 4C is an end view of the sensor unit of FIG. 4B, showing the two thermal wells and the central hexagonal section 81.

For the purpose of a brief review, flow rate sensing transducers using thermal dispersion technology, as a general concept, are well known, as pointed out above. Mounted at the top of nipple 77, or connected thereto thorough wires 84 is signal processor 130 (FIG. 4A). The signal processor uses known techniques to determine mass flow rate of fluid within conduit 75 based on the relative temperature signals from reference sensor 80 and active sensor 79.

Figure 5A:
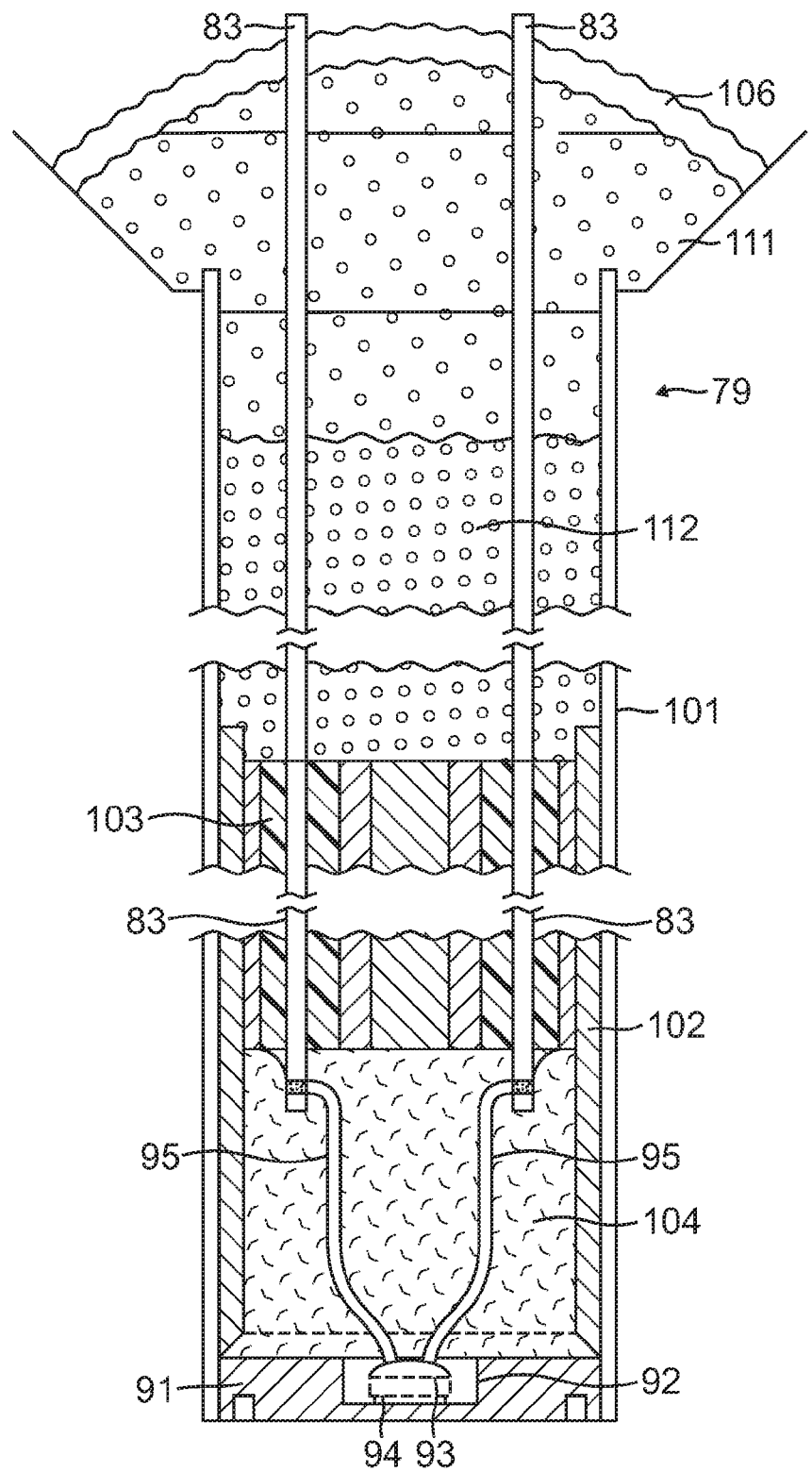
FIG. 5A is a greatly enlarged sectional view of the thermal well of FIGS. 4A and 4B.

The interior of a preferred embodiment of a thermal well 79 is shown in FIG. 5A. Even though one thermal well includes an active, or heated, sensor and the other is a reference sensor, the interior structures are identical. Since they are identical and are constructed of mineral or metal materials which do not tend to change in characteristics with age, such a sensor unit may never have to be recalibrated after the initial factory calibration, or even in an end use installation.

When active sensor 79 is heated, the RTD therein changes resistance and, therefore, provides an output signal which reflects the cooling effect of the flowing fluid. The difference in the outputs of sensors 79 and 80, ΔT, is determined by known circuitry in the signal processor and an output thereof is a precise measure of the mass flow rate of the flowing fluid in conduit 75.

Seal cap 91 may be a highly corrosion resistant stainless steel, SS316L being preferred, or a nickel-based steel alloy of the type sold under the trademark, Hastelloy, a registered trademark of Haynes international, Inc., of Kokomo, Ind. Mounted in depression 92 in the seal cap is resistance temperature detector (RTD) 93, which is secured to the seal cap by high temperature silver solder 94 or lower fusing temperature solders. No flux is employed. Signal wires 95 extend from the RTD and are welded to single strand stainless steel wires 83. The base of depression 92 is as thin as possible so that RTD 93 is as close as possible to the media being sensed.

Tubular wall 101 forms the shell of thermal well 79. For specific example reference purposes, tube 101 can have a wall thickness of about 0.006 inch, is about one inch long and is about 0.250 inch in outside diameter. This is an exemplary size only and the tube could be longer or shorter, or larger or smaller in diameter as well as wall thickness. In order to minimize axial thermal transfers along the length of tube 101, it is made preferably of stainless steel and is very thin-walled. The thermal conductivity of wall 101 is no more than 10% of the thermal conductivity of copper of the same dimensions, and preferably is about 4% of copper's thermal is conductivity.

Stainless steel support tubular lining 102 occupies about one half the length of tube 101 upward from seal cap 91. Its length is about 0.5 inches and its wall thickness is about 0.020 inches. Lining 102 provides strength to the very thin tube wall 101 to resist water hammer pressure as it may occur.

Thermal insulator and support 103 is a ceramic element which positions and supports wires 83 within lining 102. This insulator, in the exemplary device shown and described, is about 0.125 inches long. The space between seal cap 91 and insulator 103, about 0.344 inches, is filled with magnesium oxide (MgO) powder 104 or any equivalent insulative material. It helps support delicate RTD wires 95 and prevents any damage to those wires in the case of the occurrence of vibrations of the instrument.

The top end of tube 101 may be sealed by porcelain end tap 106. Above insulator 103 and below end cap 106 is about 0.25 inch of space filled with MgO cement 111 at the top and about 0.25 inch of aluminum nitride (AlN) cement thermal isolator 112 between insulator 103 and MgO cement 111. Thermal isolator 112 is an excellent axial thermal conductor as web as being an internal support for thin wall 101 and yet it maintains much of the interior of thermal web 79 at process temperature because it allows radial thermal conduction. Axial thermal conductions is prevented by MgO cement 111.

Figure 5B:
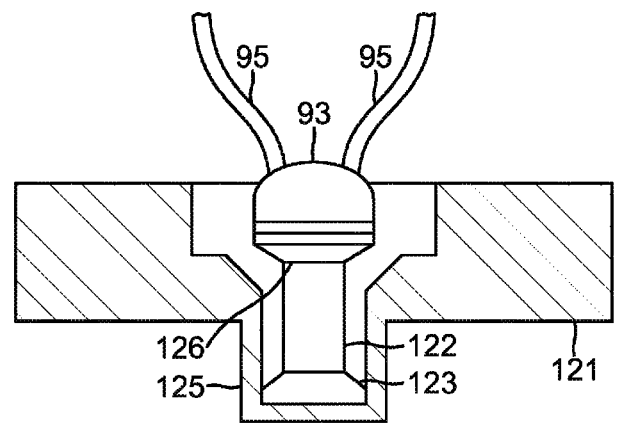
FIG. 5B is an enlarged sectional view of an alternative embodiment of the seal cap of FIG. 5A.
Figure 5C:
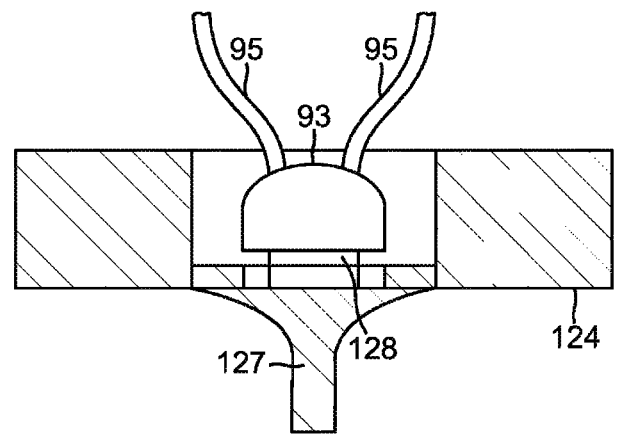
FIG. 5C is an enlarged sectional view of another alternative embodiment of the seal cap of FIG. 5A.

Optional alternatives of the FIG. 5A structure are shown in FIGS. 5B and 5C. Formed with seal can 121 in FIG. 5B (equivalent to seal cap 91) is fin 125. This is a downwardly projecting cup-shaped extension of the seal cap. Residing within fin 125 is two-headed (dumbbell-shaped highly conductive element 122. Bottom end 123 of this element is soldered or brazed, without flux, to the inside surface of fin 125 and RTD 93 is secured, as before, with flux-less solder, to the opposite end 126. Element 122 may be made of copper or other rigid, highly conductive material.

Fin 125 projects into the fluid flowing in conduit 75 and improves the heat exchange with the RTD by breaking up the boundary layer which tends to form on the inside peripheral surface of the conduit. By keeping the flowing media "fresh" at the RTD sensor, the temperature difference (ΔT) signaled by RTDs 93 in the thermal wells 79, 80 is accurate at any point in time.

An alternative fin structure is shown in FIG. 5C. Here fin 127 is a projection from and integral with seal can 124. RTD 93 is mounted, as before, with solder 128 in a flux-less process. Fin 127 functions in the same manner as does fin 125.

It is to be understood that the sizes and materials identified are examples only. The function of the interior filling material is to provide stability and some element of stiffness to thermal wells 79, 80 while being a very good thermal insulator. The stainless steel wires, rods, and tubes are electrical conductors. The entire thermal well structure has the function of transmitting electrical signals from the RTD through wires 83 but not permitting any appreciable amount of thermal leakage that could contaminate the signals from the RTD sensors.

To encapsulate certain aspects of the structure described above, any thermal leakage is overwhelmed by the thin wall of tube 101 and the large area of stainless steel surrounding the highly conductive AlN cement, which constitutes the thermal isolator.

The solder mounting and heat transfer path provides, as a minimum, 10 times improvement of:
1) The range from 2 ft/sec to 20 ft/sec in water and alike results probable in air/gas.
2) The accuracy and reducibility (fidelity) allows the structure to meet the commercial range of up to 10 ft/sec in water.
3) The solder as employed (no corrosive flux) has no measurable "drift" (fidelity) in signal. Whereas some instrument flow rate recalibration was recommended every 3 years owing to degradation of polymer or ceramic mounting and variations in heat transfer paths with time and temperature.
4) Response time.
5) Signal to noise ratio.

Some Advantages of the Disclosed Embodiments with Respect to the Prior Art

The metal heat transfer paths and RTD mounting means are completely stable and unchanging with time, temperature, and other service related conditions through the elimination of the potting material and the use of thinned stainless steel, heat transfer path.

The solder method of mounting permits the use of preplated, highly electrically resistant, inexpensive stable thin film chip for use at 350° F. or higher and at lower costs and enhanced performance.

What is claimed is:

1. A thermal dispersion transducer in a sensing instrument, the sensing instrument having a reference transducer and an active transducer, the active transducer being heated in order to provide a temperature differential (ΔT) signal with respect to a reference temperature transducer which provides an output indicative of the temperature of the media to be sensed, the reference and active transducers being structurally identical, the thermal dispersion transducer comprising:
    at least one elongated tubular thermal well shell having a proximal end connected to the instrument and a distal end configured to extend into the media to be sensed, said thermal well shell having a level of thermal conductivity that is equivalent to stainless steel;

a seal cap sealing the distal end of said shell, said seal cap having a surface that is internal to said shell and an external surface which is exposed to the media;

a thermal sensor fused to said internal surface of said seal cap, said sensor having lead wires extending therefrom;

a flux-free fusing material on said thermal sensor by which said sensor is fused to said seal cap;

a thermally insulative support element within said shell spaced from said seal cap;

a first thermally insulative material filling the space between said seal cap and support element, said lead wires passing through and being supported by said first thermally insulative material;

first single strand wires having thermal and electrical conductivity equivalent to stainless steel extending through said support element from said insulative material to the proximal end of said shell, said sensor lead wires being connected to said first single strand wires;

at least one electrically insulative cement filling said shell from said support element to the proximal end of said shell to seal said proximal end against air and moisture; and a nipple to which the proximal end of said thermal well is mounted, said nipple being configured to provide external electronic access to said thermal sensor and to prevent ambient temperature from being communicated to the interior of said shell.

2. The transducer of claim 1, wherein said at least one cement is thermally conductive.

3. The transducer of claim 1, and further comprising a fin projecting out from said external surface of said seal cap.

4. The transducer of claim 1, wherein said thermal well shell is made of stainless steel.

5. The transducer of claim 1, wherein said first thermally insulative material is magnesium oxide (MgO) powder.

6. The transducer of claim 1, wherein said thermally insulative support element is made of aluminum oxide ($Al_2O_3$) cement.

7. The transducer of claim 1, wherein said at least one electrically insulative cement comprises aluminum nitride (AlN) cement.

8. The transducer of claim 1, wherein said at least one electrically insulative cement comprises magnesium oxide (MgO) cement.

9. The transducer of claim 1, wherein said at least one electrically insulative comprises two different cement segments.

10. The transducer of claim 9, wherein said two different cement segments comprise a magnesium oxide (MgO) segment and an aluminum nitride (AlN) segment.

11. The transducer of claim 1, wherein said nipple has second single strand stainless steel wires connected at its distal end to said wires from said shell and at its proximal end to a signal processor.

12. The transducer of claim 11, wherein said nipple has an interior volume through which said second wires pass, said interior volume being filled with magnesium oxide (MgO).

13. A transducer sensing instrument for determining fluid mass flow rate, liquid level, non-liquid flow rate, or interface location for non-miscible liquids, the instrument having a thermal dispersion reference transducer and a thermal dispersion active transducer, the active transducer being heated in order to provide a temperature differential ($\Delta T$) signal with respect to a reference temperature transducer which provides an output indicative of the temperature of the media to be sensed, the reference and active transducers being structurally identical, the instrument comprising:

a pair of thermal dispersion transducers, each said thermal dispersion transducer comprising:

at least one elongated tubular thermal well shell having a proximal end connected to the instrument and a distal end configured to extend into the media to be sensed, said thermal well shell having a level of thermal conductivity that is equivalent to stainless steel;

a seal cap sealing the distal end of said shell, said seal cap having a surface that is internal to said shell and an external surface which is exposed to the media;

a thermal sensor fused to said internal surface of said seal cap, said sensor having lead wires extending therefrom;

a flux-free fusing material on said thermal sensor by which said sensor is fused to said seal cap;

a thermally insulative support element within said shell spaced from said seal cap;

a first thermally insulative material filling the space between said seal cap and support element, said lead wires passing through and being supported by said first thermally insulative material;

first single strand wires extending through said support element from said insulative material to the proximal end of said shell, said sensor lead wires being connected to said first wires;

at least one electrically insulative cement filling said shell from said support element to the proximal end of said shell to seal said proximal end against air and moisture;

a nipple to which the proximal end of said thermal well is mounted, said nipple being configured to provide external electronic access to said thermal sensor and to prevent ambient temperature from being communicated to the interior of said shell; and a signal processor for determining the mass fluid flow rate, liquid level, non-miscible liquid level, or non-liquid flow rate based on the temperature differential outputs ($\Delta T$) of said active and reference transducers, the outputs of said active and reference transducers being connected through said nipple to said signal processor.

* * * * *